United States Patent
Vajravel et al.

(10) Patent No.: US 11,340,883 B2
(45) Date of Patent: May 24, 2022

(54) INSTALLING, UPDATING OR RECONFIGURING AN APPLICATION WITHOUT DISABLING A WRITE FILTER

(71) Applicant: Dell Products L.P., Round Rock, TX (US)

(72) Inventors: Gokul Thiruchengode Vajravel, Bengaluru (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 16/438,301

(22) Filed: Jun. 11, 2019

(65) Prior Publication Data

US 2020/0394030 A1 Dec. 17, 2020

(51) Int. Cl.
*G06F 8/65* (2018.01)
*G06F 8/61* (2018.01)
*G06F 12/0875* (2016.01)
*G06F 9/445* (2018.01)

(52) U.S. Cl.
CPC .............. *G06F 8/65* (2013.01); *G06F 8/61* (2013.01); *G06F 9/44505* (2013.01); *G06F 12/0875* (2013.01); *G06F 2212/45* (2013.01)

(58) Field of Classification Search
CPC .......... G06F 8/61; G06F 8/65; G06F 9/44505; G06F 12/0875; G06F 2212/45
See application file for complete search history.

(56) References Cited

U.S. PATENT DOCUMENTS

| | | | | |
|---|---|---|---|---|
| 2007/0186070 | A1* | 8/2007 | Federa | G06F 12/1425 711/163 |
| 2012/0198217 | A1* | 8/2012 | Tukol | G06F 9/44505 713/1 |
| 2013/0173744 | A1* | 7/2013 | Xinglong | G06F 3/0617 709/217 |
| 2019/0108012 | A1* | 4/2019 | Rengarao Thyada | G06F 8/65 |
| 2019/0340083 | A1* | 11/2019 | Ou-Yang | G06F 11/1469 |
| 2020/0201618 | A1* | 6/2020 | Graham | G06F 8/61 |

* cited by examiner

*Primary Examiner* — S. Sough
*Assistant Examiner* — Stephen D Berman
(74) *Attorney, Agent, or Firm* — Kirton McConkie; Brian Tucker

(57) ABSTRACT

An application can be installed, updated or reconfigured without disabling a write filter. When a package is to be deployed to a client terminal to install, update or reconfigure an application, an overlay optimizer can be instructed to start a session. During the session, the overlay optimizer can analyze I/O requests to identify any I/O request that pertains to the deployment of the package. The overlay optimizer can then redirect the identified I/O requests to a session overlay that the overlay optimizer has created for the session rather than passing the I/O requests to the write filter. As a result, the artifacts that are affected by the deployment of the package will be stored in the session overlay rather than the write filter's overlay. Once the session is completed, the overlay optimizer can copy the artifacts from the session overlay to the write filter's overlay and commit them.

20 Claims, 16 Drawing Sheets

INSTALLING, UPDATING OR RECONFIGURING AN APPLICATION WITHOUT DISABLING A WRITE FILTER

CROSS-REFERENCE TO RELATED APPLICATIONS

N/A

BACKGROUND

The Windows operating system includes functionality that can prevent the content of a storage medium from being changed. In a typical example, it may be desirable to prevent the operating system image, which may be stored on a particular disk partition or on flash media, from being changed at runtime. Windows 10 provides the Unified Write Filter (UWF) and Windows 7 provides the File Based Write Filter (FBWF) both of which redirect all writes that target a "protected volume" to a RAM or disk cache called an overlay. This overlay stores changes made to the operating system at runtime but is removed when the device is restarted thereby restoring the device to its original state.

FIG. 1 illustrates how a write filter 110 can be employed to prevent the content of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The content of overlay 140 can be maintained until the operating system is restarted or until an explicit command is received to discard the content of the overlay.

United States Patent Publication No. 2018/0217940, titled "Mechanism To Free Up The Overlay Of A File-Based Write Filter" (the '940 Publication) describes techniques for employing an overlay-managing write filter (or "overlay optimizer") in conjunction with the write filter to monitor files that are stored in the overlay and move files that are not currently being accessed to thereby minimize the size of the overlay. If a request is made to access a moved file, the overlay optimizer can modify the request so that it targets the location of the moved file rather than the location of the original file on the protected volume. In this way, the fact that modified files are being moved from the overlay can be hidden from the write filter. As a result, the effective size of the overlay will be increased while still allowing the write filter to function in a normal fashion.

FIGS. 2 and 3 and the following discussion is taken from the description of the '940 Publication and is intended to provide an overview of one environment in which the present invention can be implemented. FIG. 2 is based on FIG. 1 and illustrates how an overlay optimizer 200 can be used in conjunction with write filter 110 to manage artifacts (e.g., files, folders, registry entries, etc.) that are stored in overlay 140. More particularly, overlay optimizer 200 can monitor which artifacts in overlay 140 are not currently being accessed and can move them to an overlay cache 240. Overlay cache 240 may oftentimes be implemented on a separate partition on disk 100.

In some embodiments, this moving of artifacts can be carried out by employing a copy component 200a of overlay optimizer 200 that may preferably run in user mode. After moving an artifact to overlay cache 240, overlay optimizer 200 can cause the artifact to be discarded from overlay 140 thereby reducing the size of overlay 140 to prevent overlay 140 from becoming full. To ensure that the modifications that were made to the artifact are not lost, overlay optimizer 200 can monitor I/O requests to allow it to intercept a request to access an artifact that has been moved to overlay cache 240 and cause the request to be redirected to overlay cache 240. In this way, the fact that overlay optimizer 200 moves artifacts to overlay cache 240 will be hidden from write filter 110.

FIG. 3 provides an example of various components of overlay optimizer 200. As shown, overlay optimizer 200 can include a filtering component 201 and an overlay managing component 202. Filtering component 201 can generally represent the portion of overlay optimizer 200 that functions as a filter driver in the device stack for disk 100 (or, more specifically, in the stack for the protected volume). Accordingly, filtering component 201 can be configured to process IRPs that target artifacts on the protected volume. Importantly, because overlay optimizer 200 is positioned above write filter 110, filtering component 201 will be able to process these IRPs before they are handled by write filter 110.

Overlay managing component 202 can generally represent the portion of overlay optimizer 200 that is configured to interface with write filter 110 and possibly copy component 200a for the purpose of managing which artifacts are moved from overlay 140 to overlay cache 240 and for ensuring that subsequent requests to access a moved artifact can be handled in the proper manner (e.g., by identifying and modifying requests that target a moved artifact so that the moved artifact (which would be the modified version of the artifact) will be accessed from overlay cache 240 rather than from its permanent location on disk 100). The distinction between filtering component 201 and overlay managing component 202 is for illustrative purposes only and any suitable configuration of the functionality of overlay optimizer 200 may be employed.

As shown in FIG. 3, overlay optimizer 200 can also maintain a map 203 which identifies which artifacts have been moved to overlay cache 240 as well as the specific location in overlay cache 240 where these moved artifacts are stored. Overlay managing component 202 can be configured to update and maintain map 203 based on which artifacts are moved to overlay cache 240. Overlay managing component 202 and/or filtering component 201 may also employ map 203 to properly redirect an I/O request that targets a moved artifact.

As indicated above, the role of the write filter, including when an overlay optimizer is also used, is to prevent the content of a protected volume from being modified. Therefore, in order to install, update or reconfigure an application on a protected volume, it is necessary to temporarily disable the write filter. To disable the write filter, the client terminal must be rebooted. Then, the installation, update or reconfiguration can be performed while the write filter is disabled. Finally, the client terminal must again be rebooted to re-enable the write filter. This is a tedious and time consuming process which is required even when performing a minor reconfiguration.

BRIEF SUMMARY

The present invention extends to methods, systems, and computer program products for installing, updating or reconfiguring an application without disabling a write filter. When a package is to be deployed to a client terminal to install, update or reconfigure an application, an overlay optimizer can be instructed to start a session. During the session, the overlay optimizer can analyze I/O requests to identify any I/O request that pertains to the deployment of the package. The overlay optimizer can then redirect the identified I/O requests to a session overlay that the overlay optimizer has created for the session rather than passing the I/O requests to the write filter. As a result, the artifacts that are affected by the deployment of the package will be stored in the session overlay rather than the write filter's overlay. Once the session is completed, the overlay optimizer can copy the artifacts from the session overlay to the write filter's overlay and cause them to be committed.

In some embodiments, the overlay optimizer may be configured to determine whether the write filter's overlay has sufficient free space to accommodate the deployment of the package. If so, the overlay optimizer may forego creating the session overlay. In such cases, the overlay optimizer can maintain a log of the artifacts that are affected by the deployment of the package. After the session, the overlay optimizer can employ the log to cause the write filter to commit each of the artifacts.

In some embodiments, the present invention is implemented by an overlay optimizer as a method for installing, updating or reconfiguring an application without disabling the write filter. The overlay optimizer can receive a session start request that indicates that a package is to be deployed on the client terminal to install, update or reconfigure an application. In response to the session start request, the overlay optimizer can create a session overlay in an overlay cache and can analyze I/O requests to determine whether the I/O requests pertain to the deployment of the package. For each of a plurality of I/O requests that are determined to pertain to the deployment of the package, the overlay optimizer redirects the I/O request to the overlay cache. After receiving a session stop request, the overlay optimizer can access artifacts that have been stored in the overlay cache as a result of redirecting each of the plurality of I/O requests. The overlay optimizer can next cause the artifacts to be copied to an overlay of the write filter and then cause the artifacts to be committed by the write filter.

In other embodiments, the present invention is implemented by an overlay optimizer as a method for installing, updating or reconfiguring an application without disabling the write filter. The overlay optimizer can start a session during which a package is to be deployed on the client terminal to install, update or reconfigure an application. The package has an expected overlay size. The overlay optimizer can compare the expected overlay size to an amount of free space available to an overlay of the write filter. When the expected overlay size exceeds the amount of free space available to the overlay, the overlay optimizer can create a session overlay in an overlay cache. During the session, the overlay optimizer can analyze I/O requests to determine whether the I/O requests pertain to the deployment of the package. For each of a plurality of I/O requests that are determined to pertain to the deployment of the package, the overlay optimizer can redirect the I/O request to the session overlay when the session overlay has been created or pass the I/O request to the write filter when the session overlay has not been created. After the package has been deployed, the overlay optimizer can cause artifacts that were created, modified or deleted by the plurality of I/O requests to be committed by the write filter.

In other embodiments, the present invention is implemented as computer storage media storing computer executable instructions which when executed on a client terminal that includes a write filter implement an overlay optimizer that is configured to perform a method for installing, updating or reconfiguring an application without disabling the write filter. The method comprises: receiving a session start request that indicates that a package is to be deployed on the client terminal to install, update or reconfigure an application; in response to the session start request, creating a session overlay in an overlay cache; after receiving the session start request, commencing an analysis of I/O requests to determine whether the I/O requests pertain to the deployment of the package; for each of a plurality of I/O requests that are determined to pertain to the deployment of the package, redirecting the I/O request to the overlay cache to thereby cause an artifact that is a target of the I/O request to be stored in the session overlay; receiving a session stop request; in response to the session stop request, ceasing the analysis; after receiving the session stop request, causing each artifact that is stored in the session overlay to be stored in an overlay of the write filter; and causing the write filter to commit each artifact.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client terminal" should be construed as any user computing device that is capable of executing a write filter. A client terminal would therefore include desktops, laptops, tablets, thin clients, smart phones, etc. The term "write filter" should be construed as a software component that is employed to protect the content of a storage device from being modified by redirecting I/O requests that target the content so that the modifications are stored elsewhere. Embodiments of the present invention will be described in the context of a write filter provided with the Windows operating system (e.g., the UWF or the FBWF). However, embodiments of the present invention can equally be implemented on a client terminal that runs a non-Windows operating system. In the context of a Windows-based implementation of the present invention, the term "I/O request" should be construed as encompassing registry operations. The term "artifact" should be construed as content that is stored in an overlay and may therefore encompass files, folders, registry entries, deletion entries, etc.

The term "package" will be used to represent the content of an application install, update or reconfiguration that is provided to the client terminal. A package may typically be in the form of a single compressed file (e.g., a .pkg file, a .cab file, an .rpm file, etc.) that contains all of the files and settings that are necessary to perform the install, update or reconfiguration. For example, when a package is intended for a Windows client terminal, it may include an executable (.exe), a dynamic link library (.dll), a number of registry key/value pairs, supporting files (e.g., an .ini file), etc. It is noted, however, that the exact content and form of any particular package is not important to the present invention. The term "application" should be construed as encompassing components of the operating system. For example, a package may include content for updating or reconfiguring a component of the operating system.

As will be described below, a package may oftentimes be delivered via a client/server model in which a management server (e.g., the Wyse Management Suite) pushes the package to an agent (e.g., the Wyse Device Agent) executing on the client terminal. However, embodiments of the present invention could also be implemented when a package is provided manually (e.g., when an administrator interacts directly with an agent or other component on the client terminal to initiate the install). The term "deploy" will be used to represent the process of providing a package to the client terminal and then applying it. "Deploying a package" should therefore encompass applying the package to either install a new application on the client terminal, update an existing application or reconfigure an existing application.

Figure 1:
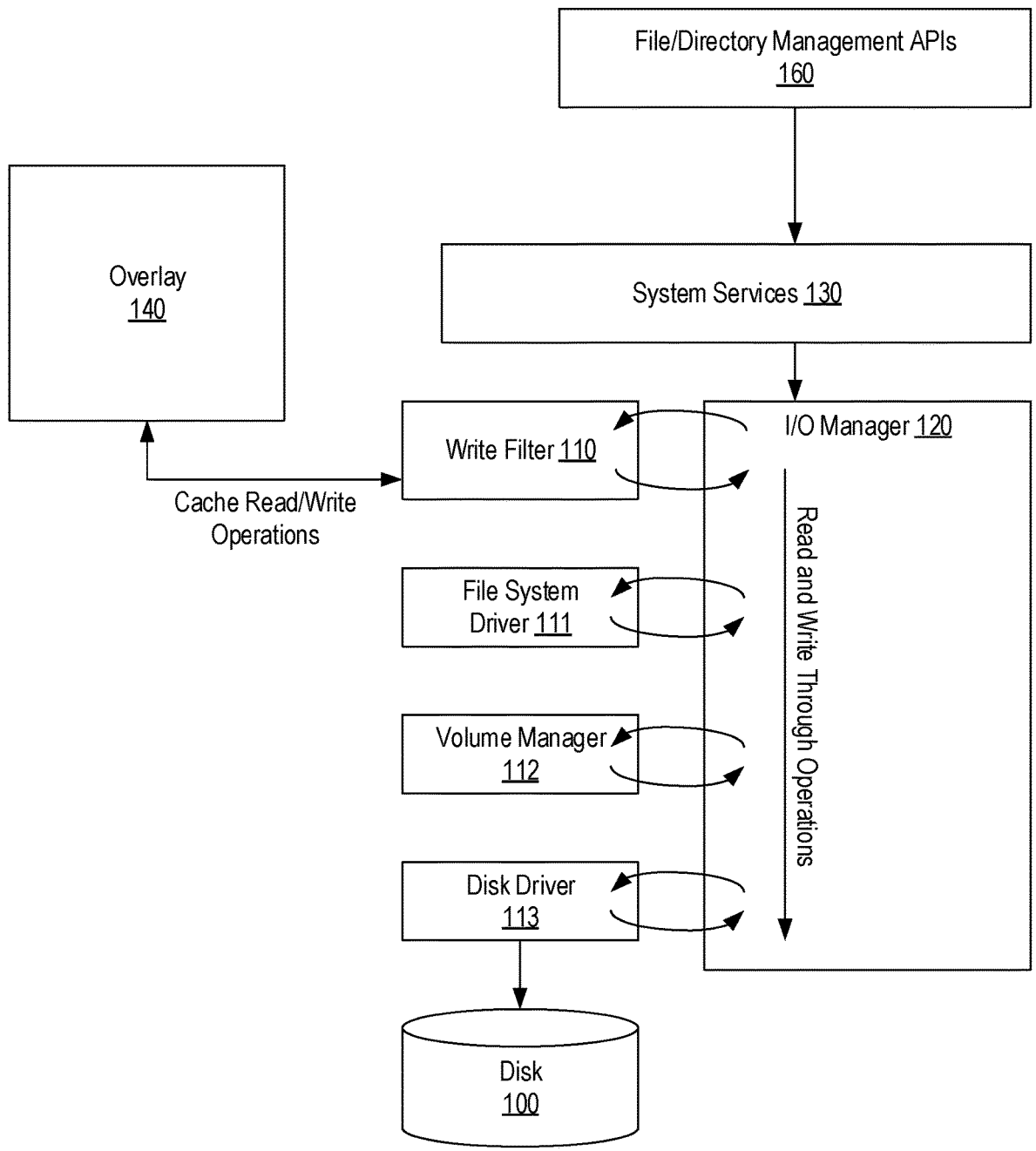
FIG. 1 illustrates a Windows-based I/O system in which a write filter is employed to redirect writes targeting a protected volume to an overlay.
Figure 2:
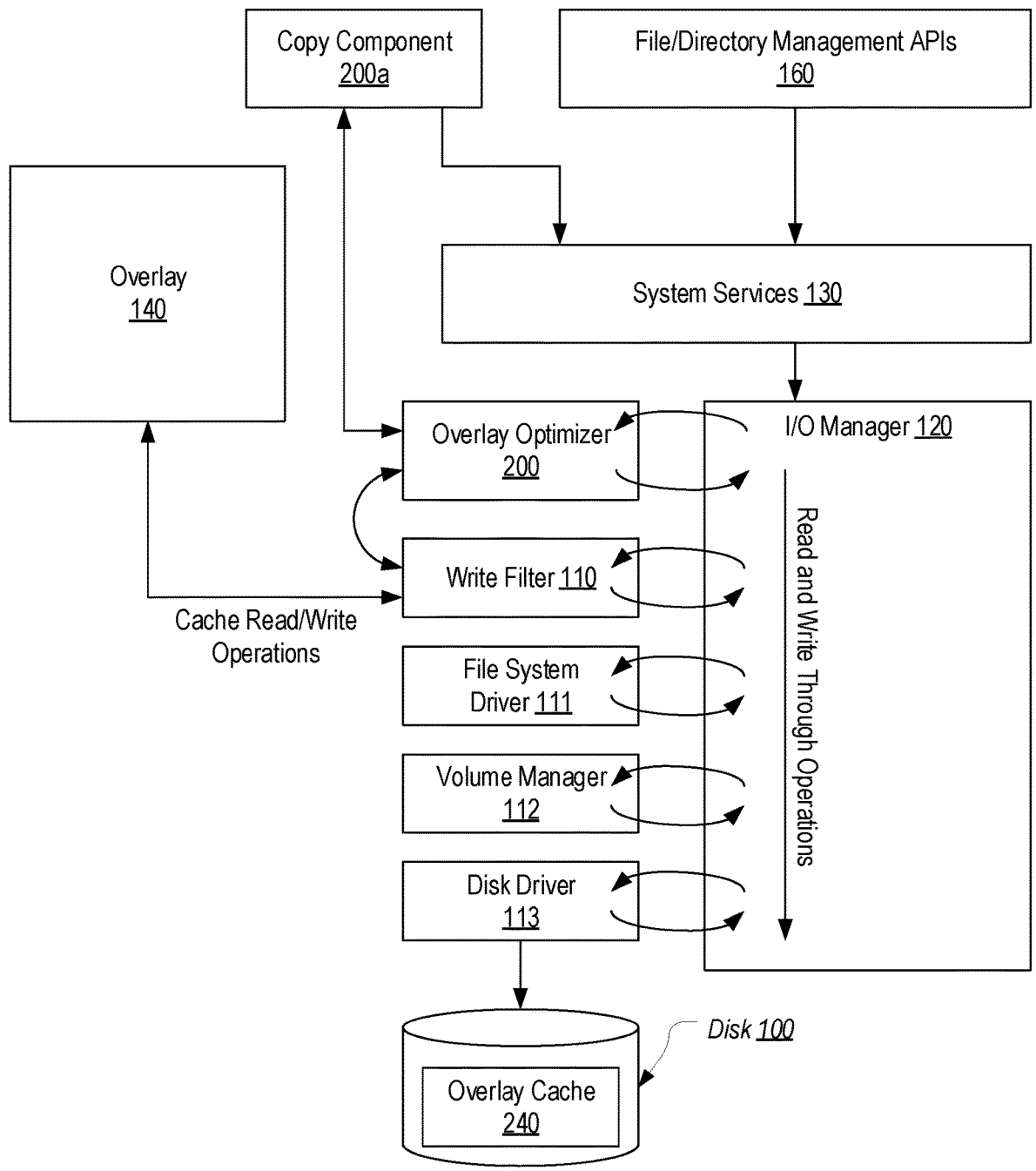
FIG. 2 illustrates how an overlay optimizer can be employed in conjunction with the write filter of FIG. 1 to free up the overlay.
Figure 3:
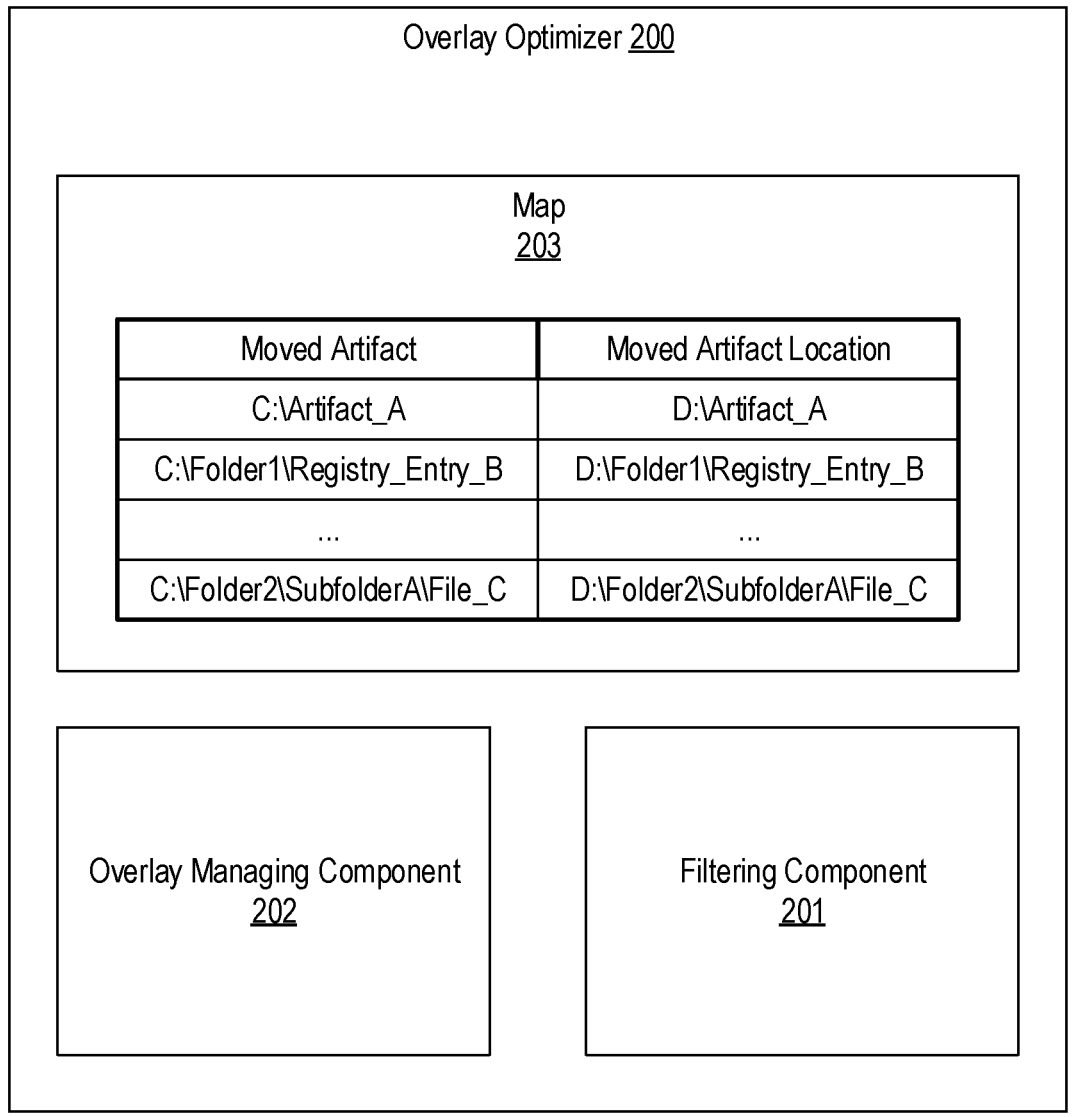
FIG. 3 illustrates various example components of an overlay optimizer.
Figure 4:
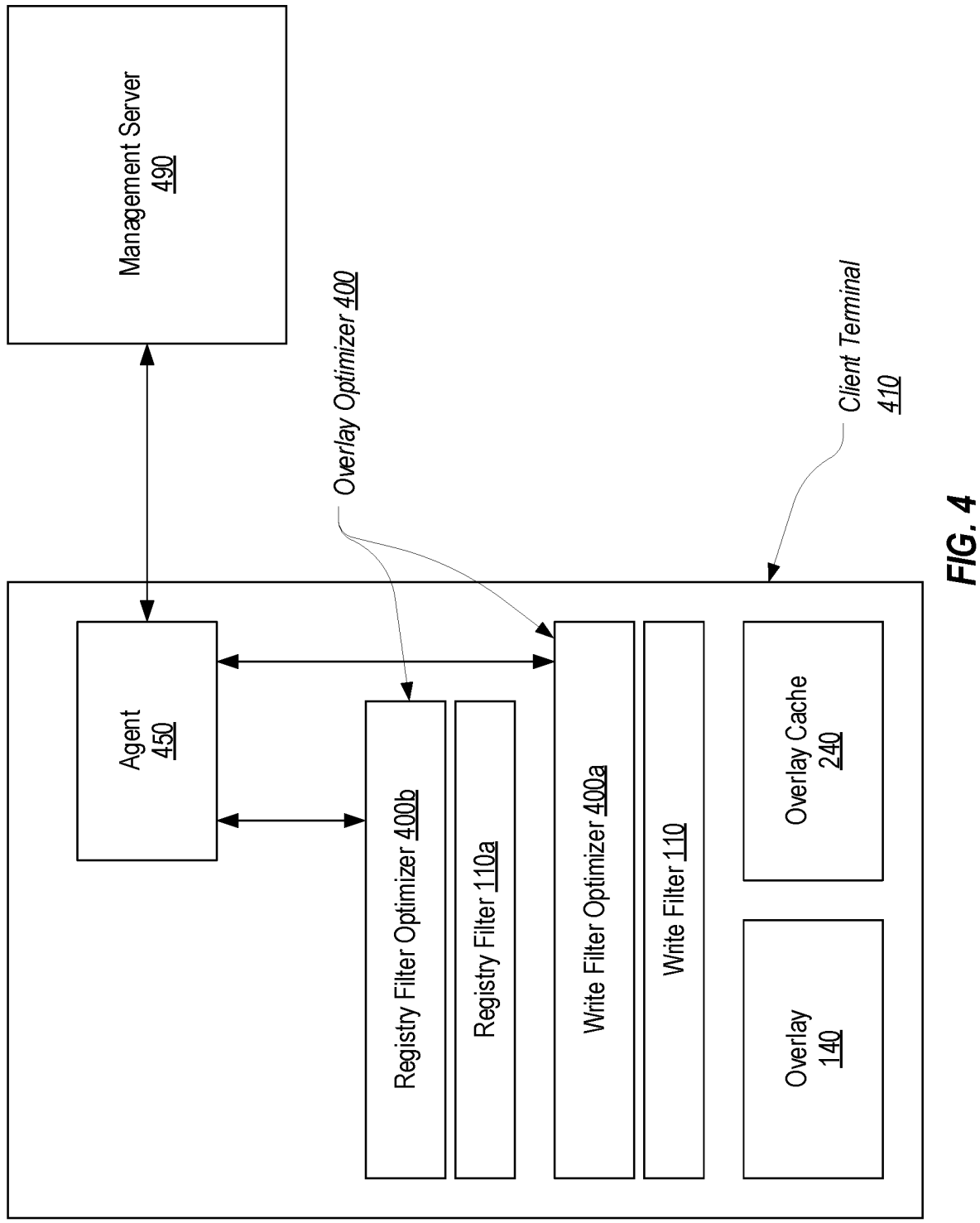
FIG. 4 illustrates an example client/server environment in which embodiments of the present invention can be implemented.

FIG. 4 illustrates an example client/server environment in which embodiments of the present invention can be implemented. FIG. 4 includes a client terminal 410 and a management server 490. Client terminal 410 includes write filter 110 (e.g., uwfs.sys or fbwf.sys in Windows environments). Write filter 110 may also provide a registry filter 110a (e.g., uwfreg.sys) which can represent the portion of write filter 110 that handles registry operations. Unless otherwise specified, references to write filter 110 should be construed as encompassing registry filter 110a. As described in the background, write filter 110 can redirect I/O requests to overlay 140 so that the content of a protected volume (e.g., a volume on disk 100) is not modified. Although not shown, the same or similar components of the driver stack shown in FIG. 1 may also be present on client terminal 410 but have been omitted to simplify the figure.

Client terminal 410 also includes overlay optimizer 400 which includes a write filter optimizer 400a and a registry filter optimizer 400b. As described in the background, write filter optimizer 400a is positioned above write filter 110 in the driver stack so that it can handle I/O requests before they are passed to write filter 110. Similarly, registry filter optimizer 400b is positioned above registry filter 110a so that it can handle registry operations before they are passed to registry filter 110a. Overlay optimizer 400 can be configured to perform similar functionality as overlay optimizer 200 to implement overlay cache 240 as was described in the background.

Client terminal 410 also includes an agent 450 that is configured to communicate with management server 490 and with overlay optimizer 400. As described below, management server 490 can be employed to initiate the process of deploying a package to client terminal 410. In other embodiments, however, agent 450 can represent a service with which an administrator may interact locally to initiate the process of deploying a package on client terminal 410.

In accordance with embodiments of the present invention, overlay optimizer 400 can be configured to enable an application to be installed, updated or reconfigured on client terminal 410 without disabling write filter 110. FIGS. 5A-7C illustrate an example of a process that overlay optimizer 400 can perform to accomplish this.

Figure 5A:
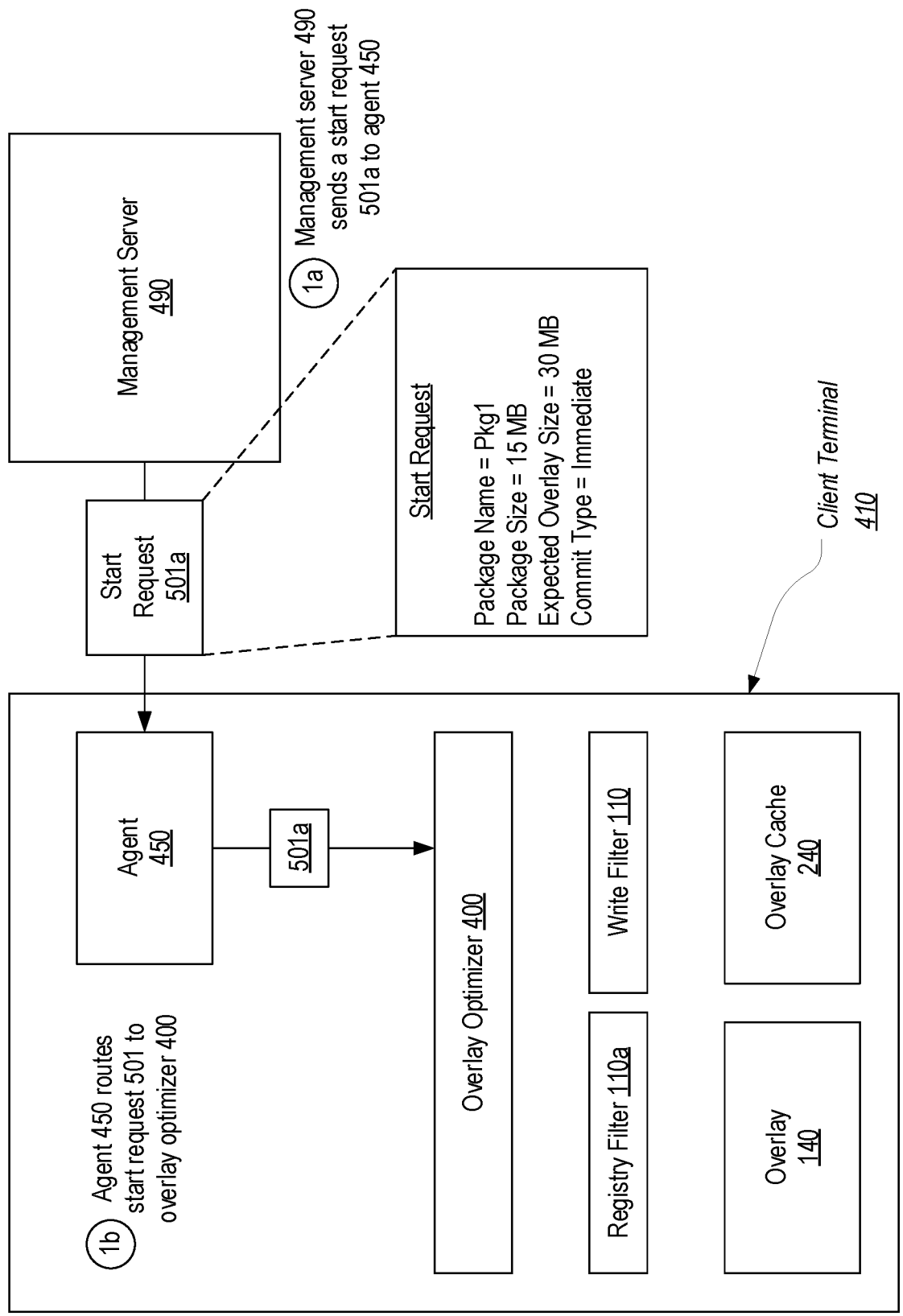
FIGS. 5A-5C illustrate how an overlay optimizer can initiate a session when a package is to be installed.
Figure 5B:
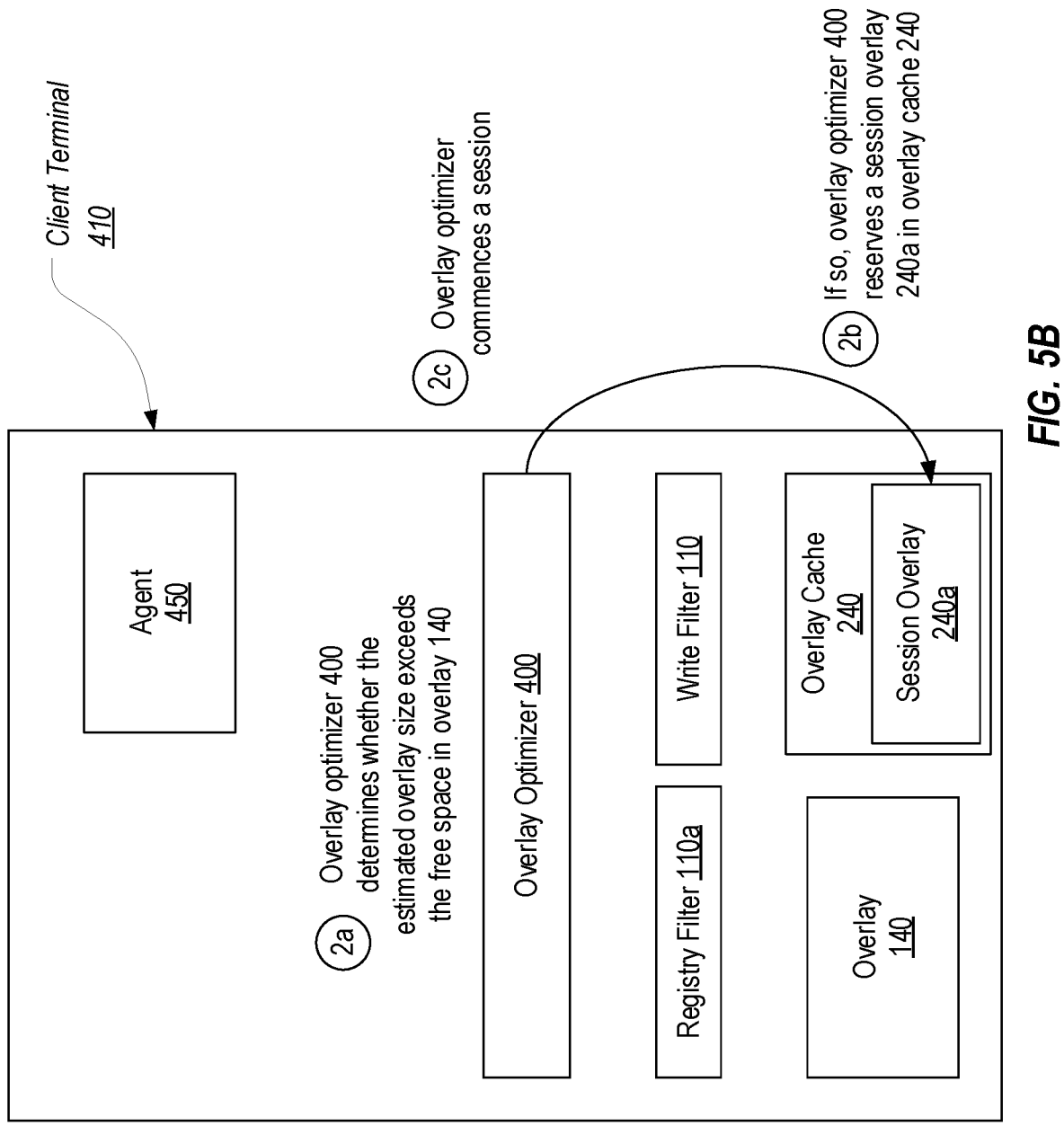
Figure 5C:
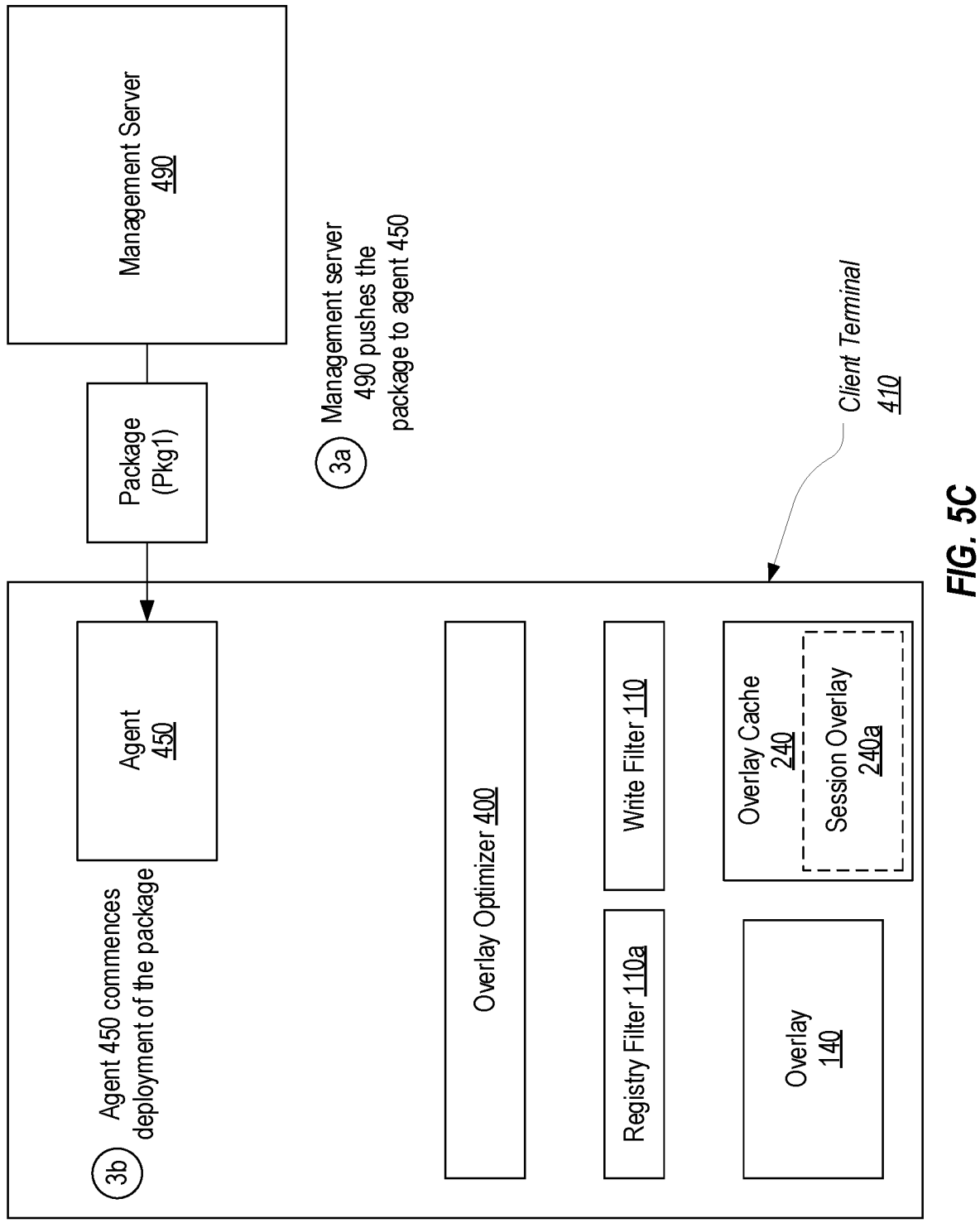

FIGS. 5A-5C illustrate how overlay optimizer 400 initiates a session when a package is to be deployed on client terminal 410. For purposes of this example, it will be assumed that an administrator has employed management server 490 to identify a package named pkg1 and has scheduled the deployment of the package to client terminal 410. In typical embodiments, the administrator may schedule the deployment of the same package to many client terminals (e.g., to all thin clients having the same architecture in an enterprise environment).

In step 1a shown in FIG. 5A, management server 490 sends a start request 501a to agent 450. Management server 490 can send start request 501a to instruct overlay optimizer 400 to start a session for the deployment of a package. As shown, start request 501a can include information about the package to be deployed such as the package name (Pkg1), the package size (15 MB), the expected overlay size (30 MB) and a commit type (Immediate). The package size defines the size of the package that will be sent to agent 450 (e.g., the size of the .pkg, .cab or .rpm file). In contrast, the expected overlay size represents the total size of the contents of the package. For example, after the package is downloaded to client terminal 410, its contents will be extracted and written to the appropriate locations as part of the installation. The expected overlay size represents the amount of space in the overlay that these writes would require. The commit type may be immediate or reboot. An immediate commit is performed once the installation is completed, whereas a reboot commit is performed at reboot. In step 1b, agent 450 can route start request 501a (e.g., in the form of an IOCTL) to overlay optimizer 400 to thereby instruct overlay optimizer 400 to start a session.

Turning to FIG. 5B, in step 2a, overlay optimizer 400 can analyze start request 501a to determine whether the expected overlay size specified in start request 501a exceeds the amount of free space that currently exists in overlay 140. For example, if write filter 110 is the UWF, in response to receiving start request 501a, overlay optimizer 400 could query the AvailableSpace property of the UWF Overlay structure to determine the amount of free space that is available to overlay 140 and then compare this amount to the expected overlay size for the package.

If the expected overlay size specified in start request 501a exceeds the amount of free space available in overlay 140 (or exceeds a defined percentage of the amount of free space in overlay 140), in step 2b, overlay optimizer 400 can reserve a session overlay 240a in overlay cache 240. Then, in step 2c, overlay optimizer 400 can commence a session.

To reserve session overlay 240a in overlay cache 240, overlay optimizer 400 may create a dummy file in overlay cache 240 and set the size of the dummy file to the expected overlay size. For example, in Windows-based implementations, overlay optimizer 400 could call ZwCreateFile to create a file in overlay cache 240 and then call ZwSetInformationFile to extend the end of file position to match the expected overlay size. By reserving session overlay 240a, overlay optimizer 400 can ensure that I/O requests that do not pertain to the deployment of a package do not consume space in overlay cache 240 that overlay optimizer 400 intends to use.

In FIG. 5C, session overlay 240a is shown in dashed lines to represent that overlay optimizer 400 may or may not have created the session overlay. FIG. 5C also shows that, in step 3a, management server 490 pushes the package to agent 450. Although represented as occurring after steps 2a-2c, management server 490 can push the package at any time including with start request 501a. In any case, once the package has been stored on client terminal 410, in step 3b, agent 450 can commence the deployment of the package on client terminal 410. Agent 450 can commence the deployment after sending start request 501a to overlay optimizer 400 to ensure that overlay optimizer 400 has started the session before the deployment commences.

Figure 6A:
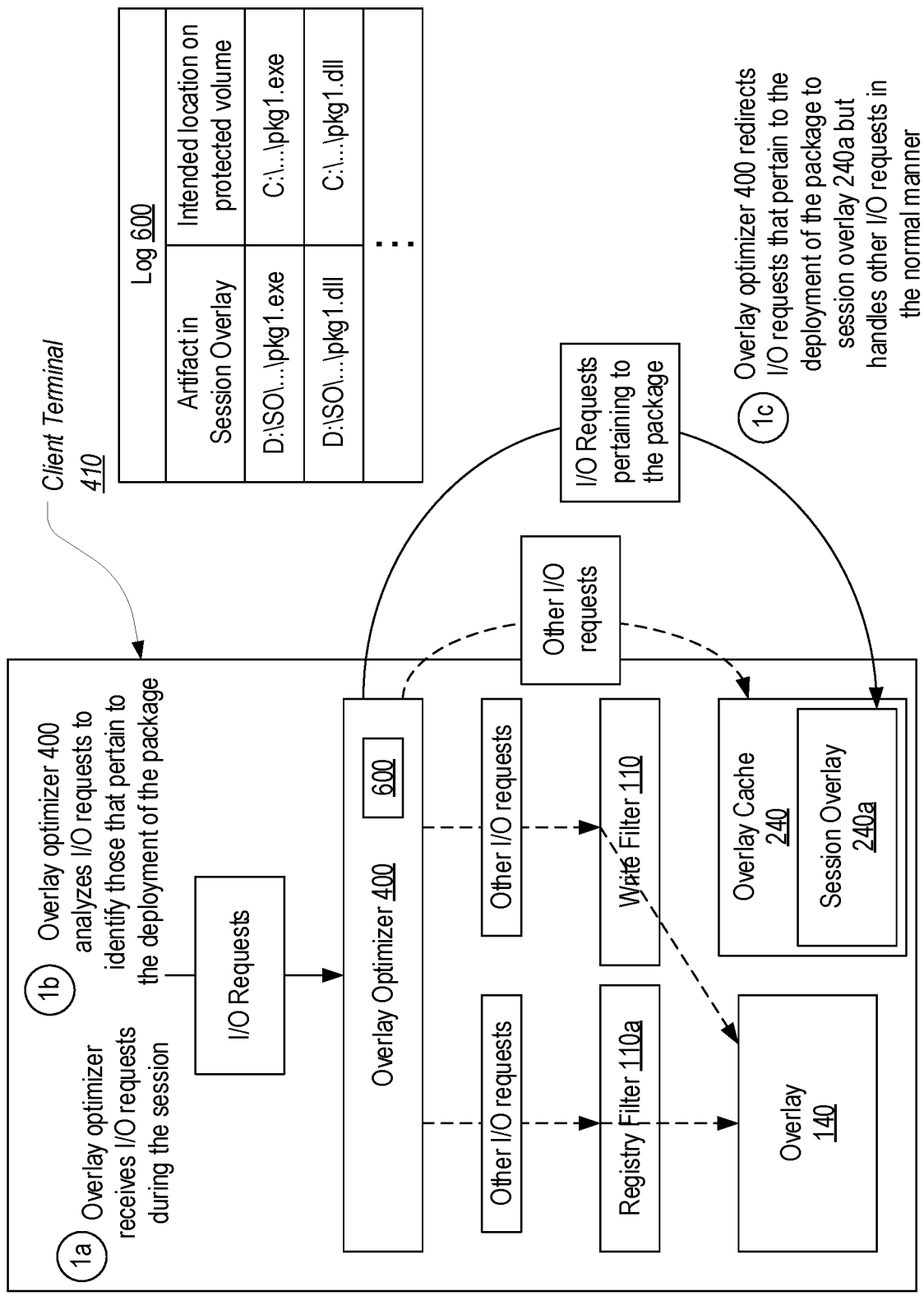
FIGS. 6A-6C illustrate how the overlay optimizer can handle I/O requests that are received during the session when the size of the package is greater than a defined value.
Figure 6B:
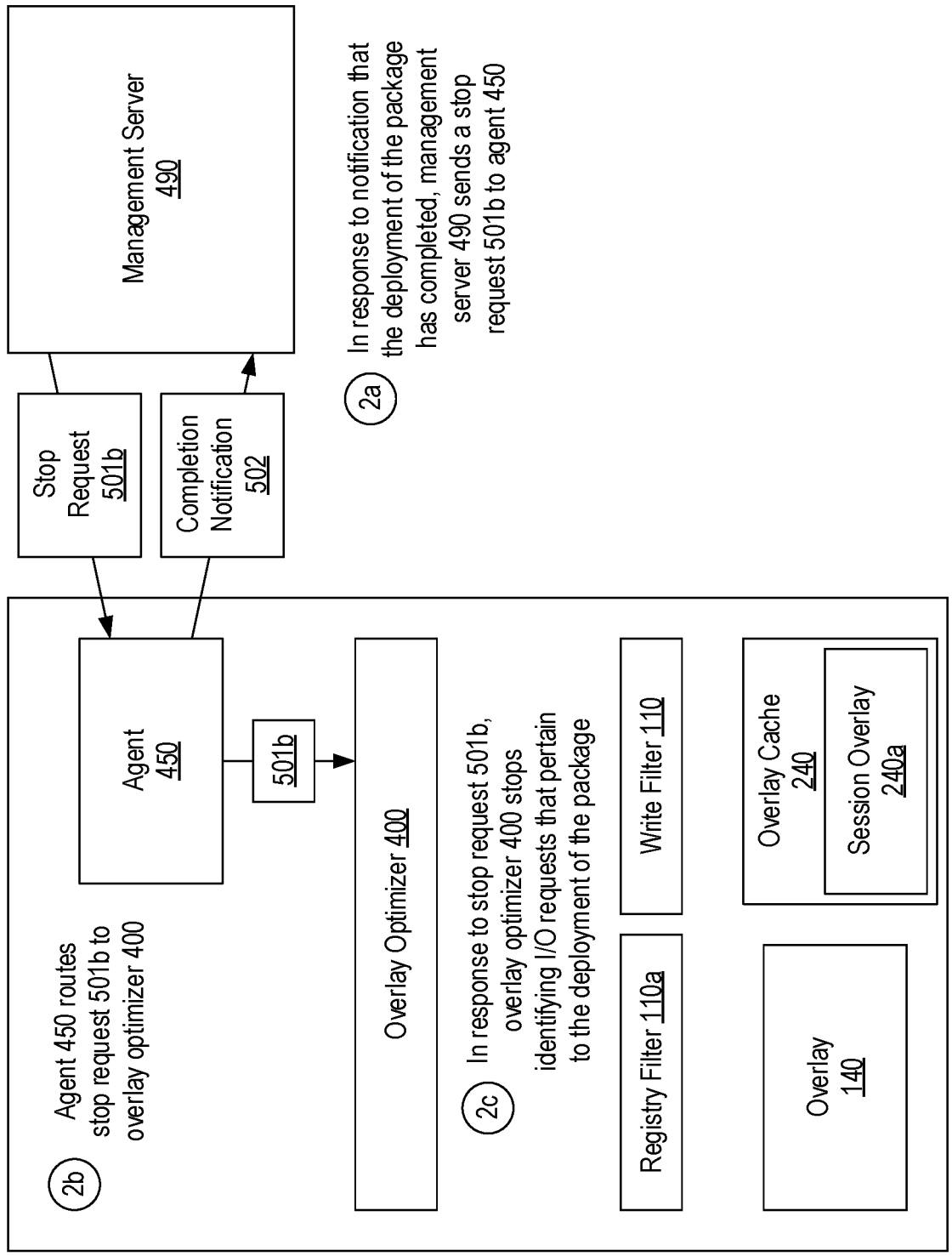
Figure 6C:
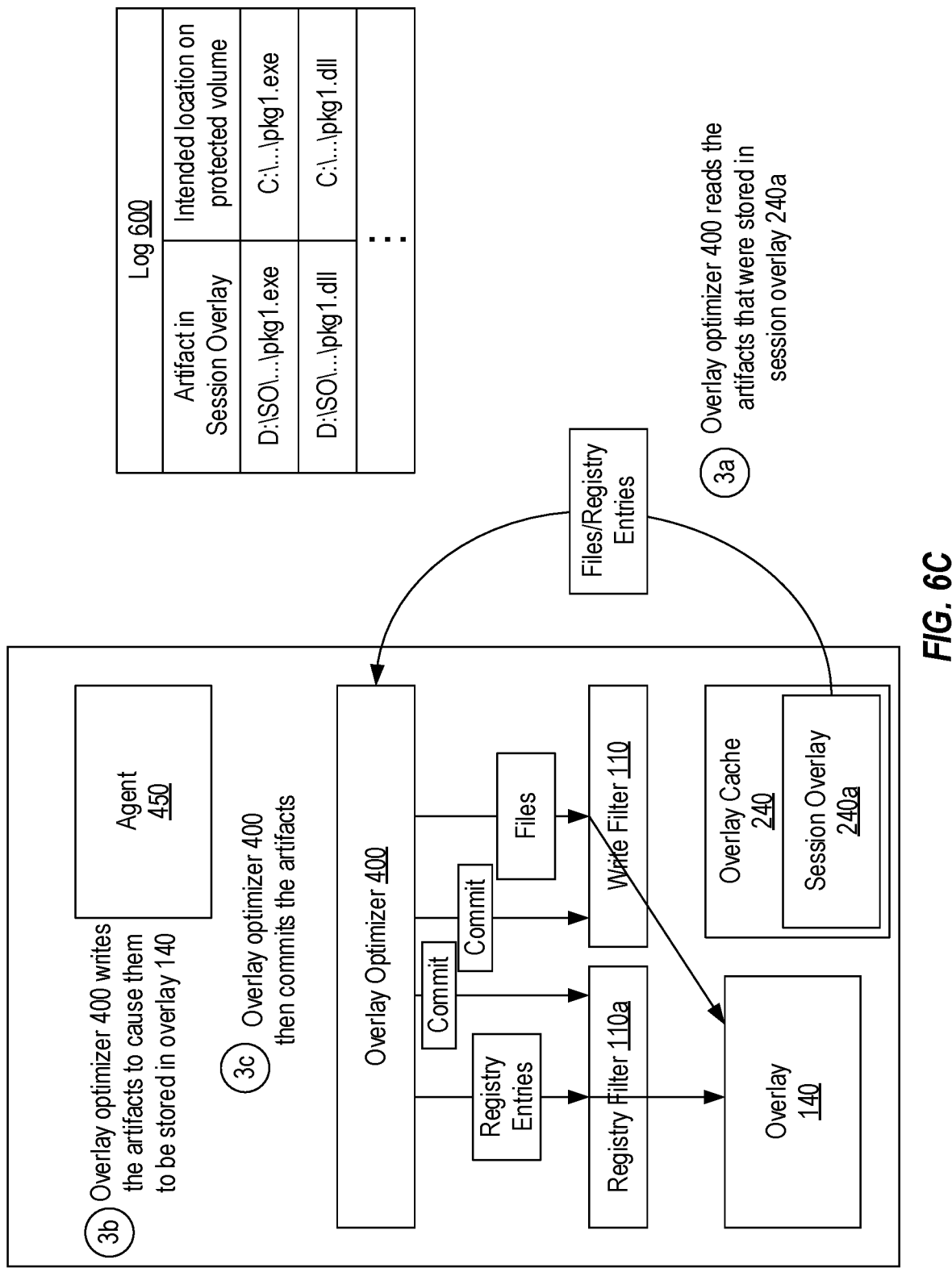
Figure 7A:
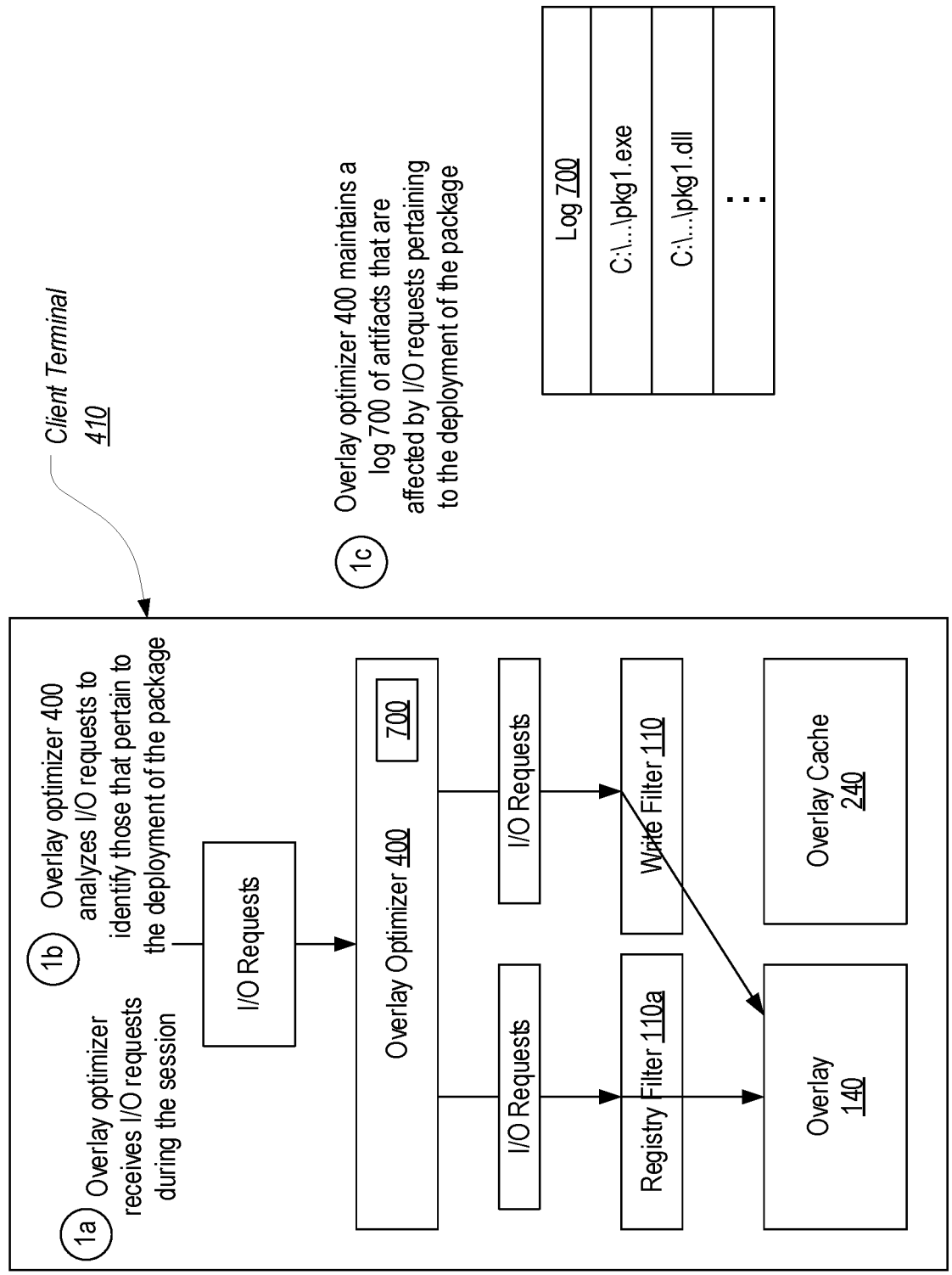
FIGS. 7A-7C illustrate how the overlay optimizer can handle I/O requests that are received during the session when the size of the package is smaller than the defined value.
Figure 7B:
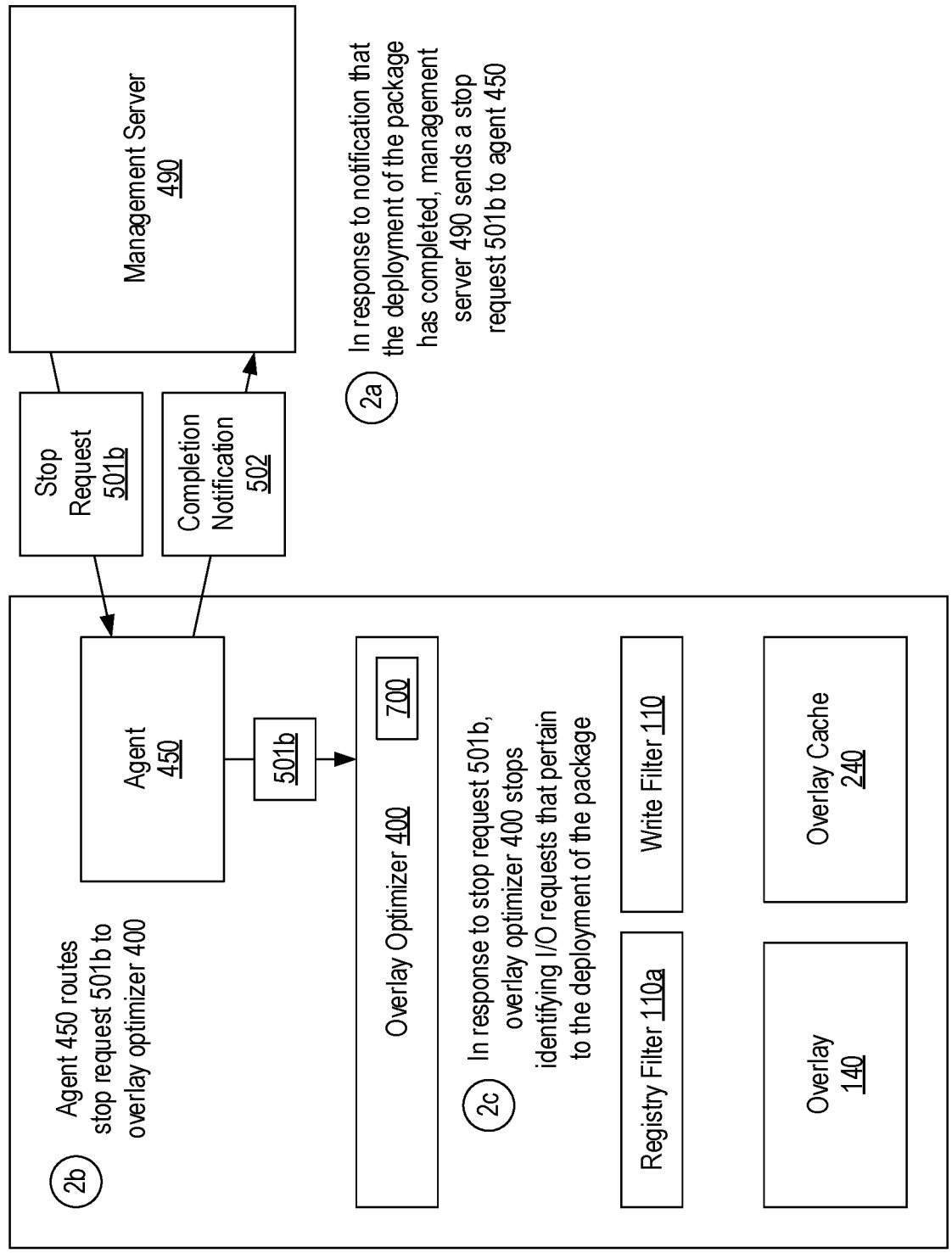
Figure 7C:
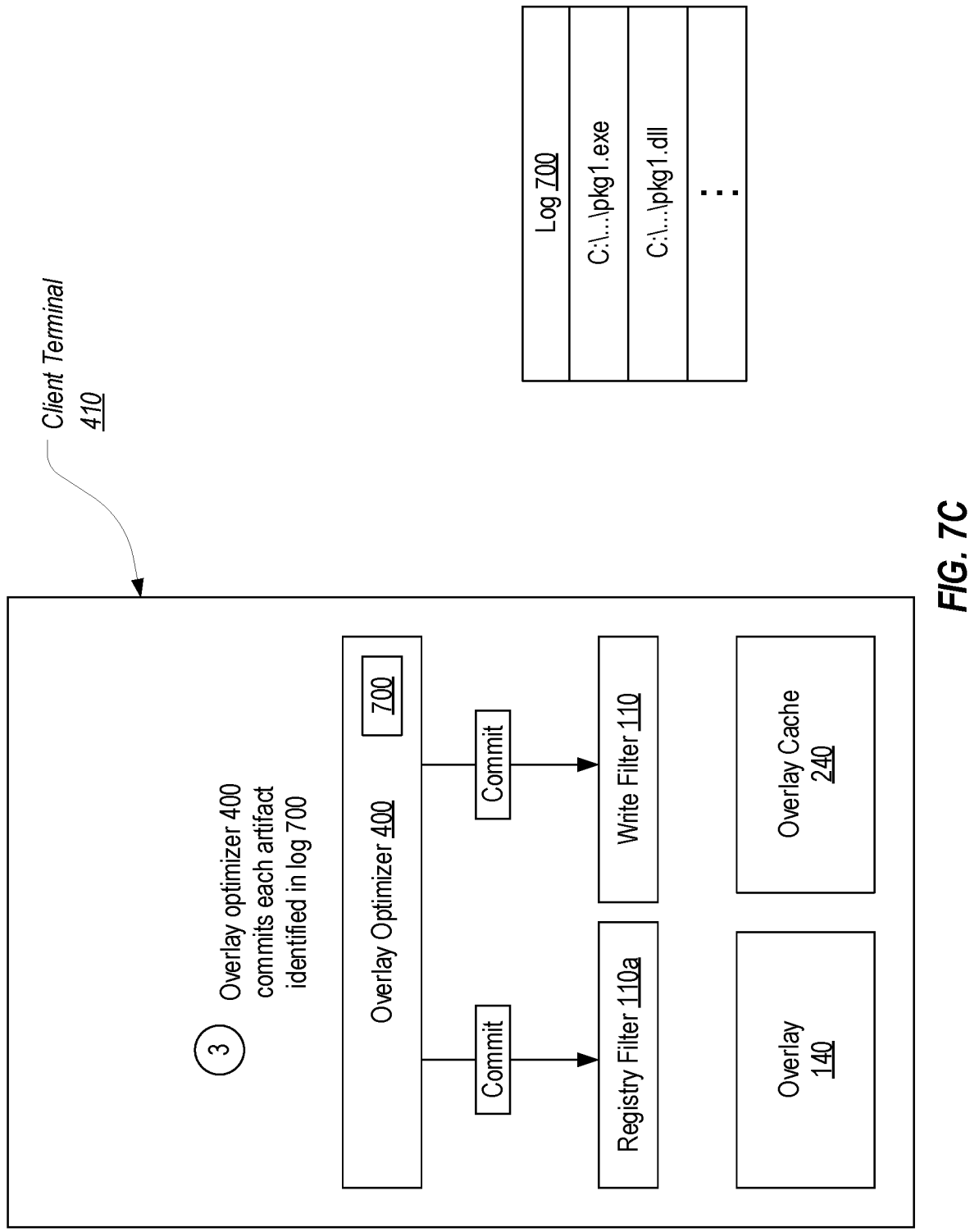

FIGS. 6A-6C illustrate the processing that overlay optimizer 400 can perform after it has started a session when session overlay 240a is used. In contrast, FIGS. 7A-7C illustrate the processing that overlay optimizer 400 can perform after it has started a session when session overlay 240 is not used.

Prior to describing the processing that overlay optimizer 400 performs during a session, it is noted that, as a result of step 3b shown in FIG. 5C, I/O requests pertaining to the deployment of the package will be passed to overlay optimizer 400. At the same time, I/O requests that do not pertain to the deployment of the package will also likely be passed to overlay optimizer 400. For example, while agent 450 deploys the package, other applications executing on client terminal 410 will also likely create I/O requests. Outside of a session, overlay optimizer 400 could handle all I/O requests in a "normal" manner such as is described in the background. However, within a session, overlay optimizer 400 can handle the I/O requests pertaining to the deployment of the package in a unique manner as described below. Accordingly, in this context, the term "session" is intended to represent a time period during which overlay optimizer 400 handles I/O requests in a different manner in order to allow an application to be installed, updated or reconfigured without disabling write filter 110.

Turning to FIG. 6A, in step 1a, overlay optimizer 400 receives I/O requests during the session. For example, write filter optimizer 400a or registry filter optimizer 400b can receive an I/O request as part of its delete, write or rename pre-handler routines. Because a session has been started, in step 1b, overlay optimizer 400 analyzes the I/O request to determine whether it pertains to the deployment of the package. This can be accomplished by identifying the process name associated with the I/O request and determining whether the process name matches agent 450. In other words, overlay optimizer 400 can determine whether agent 450 created the I/O request. Given that agent 450 deploys the package during the session, overlay optimizer 400 can determine that any I/O request that originated from agent 450 during the session pertains to the deployment of the package.

Overlay optimizer 400 can employ any suitable technique to identify the process name associated with each I/O request. For example, overlay optimizer 400 can identify the process ID that is currently associated with the I/O request and then use the process ID to obtain the process name. In some cases, however, this approach will fail to identify an I/O request that agent 450 initiated. For example, if a higher-level filter first processes an I/O request that agent 450 created, it may pend the received I/O request and create another corresponding I/O request to pass down the driver stack. In such cases, the process ID of the filter would be associated with the version of the I/O request that is passed to overlay optimizer 400 even though the I/O request originated with agent 450.

To address such issues, overlay optimizer 400 can also identify the process name of any ancestor of the process that is currently associated with the I/O request. If the process name of any ancestor matches agent 450, overlay optimizer 400 can determine that the I/O request pertains to the deployment of the package. In Windows-based implementations, to identify the process name of an ancestor, overlay optimizer 400 can obtain the thread ID from the Tail.Overlay.Thread field of the I/O request (or I/O request packet (IRP)) and then use the IoThreadToProcess API to obtain the process ID from the thread ID. The process name could then be obtained using the process ID. If agent 450 originated the I/O request, the process ID obtained from the thread ID will match agent 450's process ID. Therefore, by employing the thread ID to obtain the process ID, overlay optimizer 400 can ensure that the name of the originating process, and not some intermediary process such as another filter, will be identified.

After analyzing an I/O request, in step 1c, overlay optimizer 400 can redirect the I/O request to session overlay 240a if it pertains to the deployment of the package. Otherwise, overlay optimizer 400 can handle the I/O request in a normal manner such as by passing the I/O request to write filter 110 (or registry filter 110a). As a result of these steps, overlay optimizer 400 will cause any I/O requests that pertain to the deployment of the package (or at least those that modify artifacts on the protected volume) to be redirected to session overlay 240a.

As part of redirecting an I/O request, overlay optimizer 400 may maintain a log 600 of artifacts that are stored in session overlay 240*a*. As shown in FIG. 6A, log 600 can map each artifact stored in session overlay 240*a* to its intended location on the protected volume. Overlay optimizer 400 can obtain this intended location from the I/O request. For example, if overlay optimizer 400 identifies an I/O request that creates a new file "C:\ . . . \pkg1.exe" as part of deploying the package, it can redirect this request so that the file is created at "D:\SO\ . . . \pkg1.exe" (where overlay cache 240 is assumed to be implemented on the D: partition and the SO folder is assumed to be used to isolate the session overlay 240*a* from other artifacts stored in overlay cache 240).

It is noted that this log 600, which defines where artifacts related to the deployment of a package are originally and temporarily stored during a session, is different from map 203 which defines artifacts that where originally stored in overlay 140 but have been moved to overlay cache 240. Although not shown in FIG. 6A, log 600 can also maintain delete entries which identify artifacts that are deleted as part of the installation of the package. For example, if overlay optimizer 400 identifies an I/O request that deletes an existing file "C:\ . . . \pkg.exe" as part of installing the package, it can create an entry in log 600 that so indicates.

As part of redirecting an I/O request to session overlay 240*a*, overlay optimizer 400 can also shrink the size of the dummy file that it created to reserve the space for session overlay 240*a* within overlay cache 240. For example, in response to identifying an I/O request that pertains to the deployment of the package, overlay optimizer 400 can identify the size of the artifact that will be stored in session overlay 240*a* as a result of redirecting the I/O request and can shrink the size of the dummy file by a corresponding amount to thereby guarantee space in overlay cache 240 for the artifact. This incremental reduction of the size of the dummy file prevents the reserved space in overlay cache 240 from being consumed by other applications that may create I/O requests while agent 450 is deploying the package.

In FIG. 6B, it is assumed that agent 450 has completed the deployment of the package and therefore sends a completion notification 502 to management server 490. In response, and as represented in step 2*a*, management server 490 sends stop request 501*b* to agent 450. In step 2*b*, agent 450 routes stop request 501*b* (e.g., as an IOCTL) to overlay optimizer 400 (including write filter optimizer 400*a* and registry filter optimizer 400*b*). In step 2*c*, and in response to stop request 501*b*, overlay optimizer 400 can stop the session by ceasing to identify I/O requests that pertain to the deployment of the package. In other words, in response to stop request 501*b*, overlay optimizer 400 can return to handling all I/O requests in a normal manner.

At this point, any files or registry entries that were affected (e.g., created or modified) by the deployment of the package will be stored in session overlay 240*a*. For example, if the deployment of the package created a new .dll file, the .dll file will be stored in session overlay 240*a*. Similarly, if the deployment of the package modified the value of a registry key, the registry key with its modified value will exist in session overlay 240*a*. Because overlay cache 240 is implemented as volatile storage, its contents, including the artifacts stored in session overlay 240*a*, will be discarded once client terminal 410 is rebooted. Accordingly, to ensure that the effects of the deployment of the package are persisted, overlay optimizer 400 can cause the artifacts stored in session overlay 240*a* to be copied to overlay 140 and can then commit the artifacts to the protected volume.

As represented in step 3*a* in FIG. 6C, overlay optimizer 400 can employ log 600 to read each artifact that was stored in session overlay 240*a* during the session (e.g., by calling FltCreateFile to open each file identified in log 600 and then calling FltReadFile to read the content of the opened file). In step 3*b*, overlay optimizer 400 can then write the read content (e.g., by calling FltWriteFile) which will, in essence, cause the corresponding artifact to be copied to overlay 140 by either write filter 110 or registry filter 110*a*. In step 3*c*, overlay optimizer 400 can commit any artifact that it copied from session overlay 240*a* to overlay 140 (e.g., by calling CommitFile (or CommitRegistry) using the name of each artifact). Although not shown, overlay optimizer 400 can also delete the artifact from session overlay 240 once the artifact has been copied to overlay 140.

For any artifact that log 600 indicates was deleted as part of the deployment of the package, overlay optimizer 400 can issue an I/O request to delete the artifact (e.g., by calling FltCreateFile with the FILE DELETE ON CLOSE flag set) and then commit the delete (e.g., by calling CommitFileDeletion (or CommitRegistryDeletion) using the name of the artifact to be deleted). Based on the commit type defined in start request 501*a*, overlay optimizer 400 can perform these steps either immediately after the deployment of the package or at the next reboot. One benefit of committing the artifacts immediately is that the session overlay 240*a* will be immediately discarded thereby providing more space within overlay cache 240 for overlay optimizer 400 to use to expand the effective size of overlay 140.

In cases where overlay optimizer 400 does not reserve a session overlay, a slightly different process is performed. For example, in FIG. 7A, steps 1*a* and 1*b* are shown as being the same as steps 1*a* and 1*b* of FIG. 6A. However, in step 1*c*, overlay optimizer 700 does not redirect I/O requests that pertain to the deployment of the package but only maintains a log 700 of each artifact that is affected by such I/O requests. For example, log 700 in FIG. 7A includes entries for "C:\ . . . \pkg1.exe" and "C:\ . . . \pkg1.dll" which represent that these files were created or modified as part of the deployment of the package. Although not shown, overlay optimizer 400 could also add a delete entry to log 700 for any artifact that is deleted as part of the deployment of the package.

FIG. 7B illustrates that management server 490 and agent 450 can perform the same steps shown in FIG. 6B to notify and instruct overlay optimizer 400 to stop the session. Finally, in step 3 shown in FIG. 7C, overlay optimizer 400 can employ log 700 to commit each artifact that was affected by the deployment of the package to the protected volume (e.g., by calling CommitFile, CommitRegistry, CommitFileDeletion or CommitRegistryDeletion as appropriate for each entry in log 700). As indicated above, overlay optimizer 400 can perform these commits immediately or at the next reboot based on the commit type specified in start request 501*a*.

The selective use of session overlay 240*a* enhances the efficiency of overlay optimizer 400. In particular, with smaller packages (e.g., those having an expected overlay size less than 10 MB), it can be computationally costly to reserve session overlay 240*a* and use it during the session. Due to its use of overlay cache 240 to move artifacts from overlay 140, overlay optimizer 400 can generally ensure that there will be sufficient free space in overlay 140 at the start of a session to accommodate these smaller packages.

In summary, due to the process performed by overlay optimizer 400, a package can be deployed to client terminal 410 to install, update or reconfigure an application and to persist the installation, update or reconfiguration without disabling write filter 110. The present invention therefore greatly simplifies the process of deploying packages to client terminals. The use of agent 450 and management server 490 further simplify and automate this process.

Figure 8A:
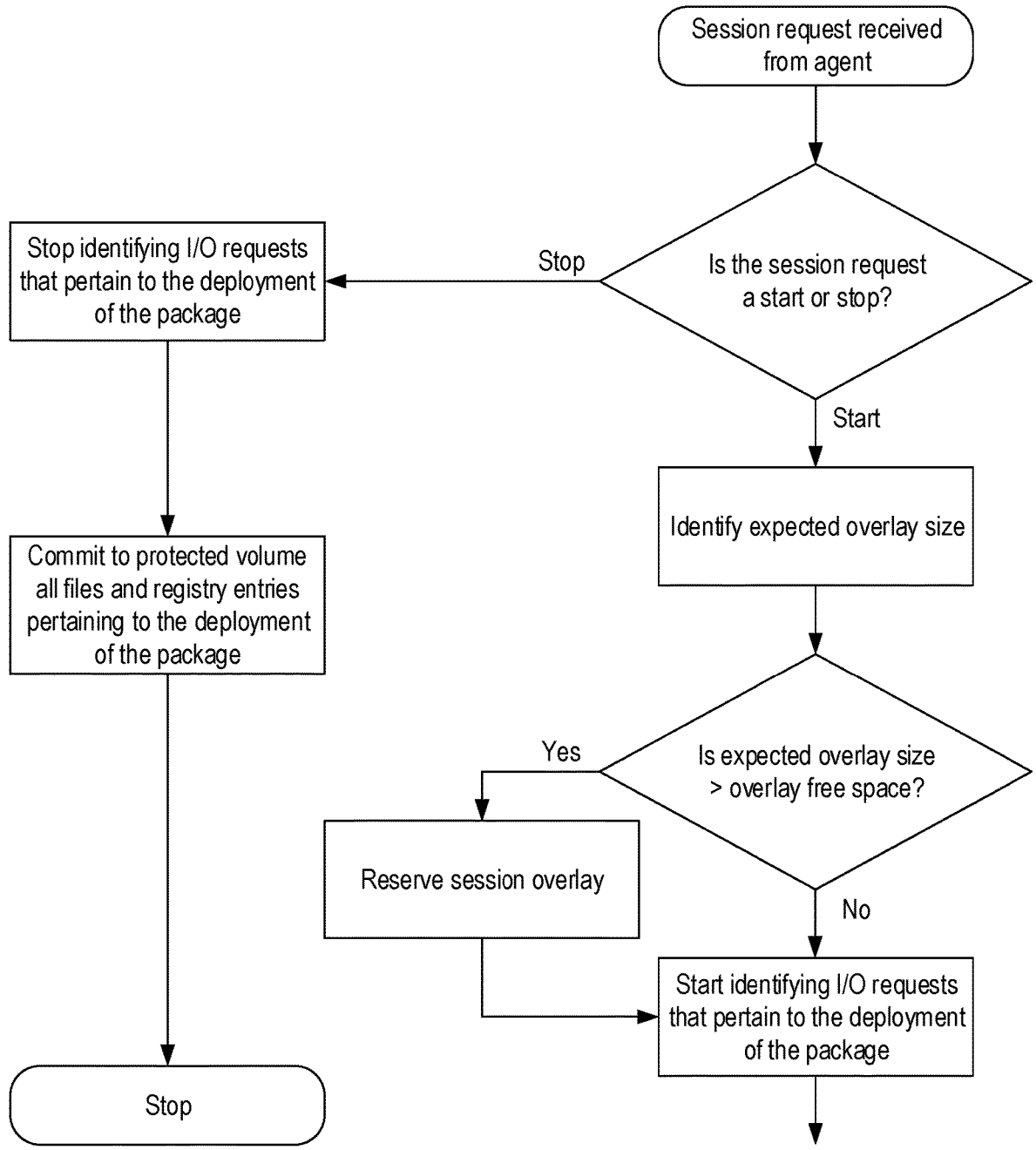
FIGS. 8A and 8B provide flow diagrams representing the functionality that the overlay optimizer can perform to allow an application to be installed, updated or reconfigured without disabling the write filter.
Figure 8B:
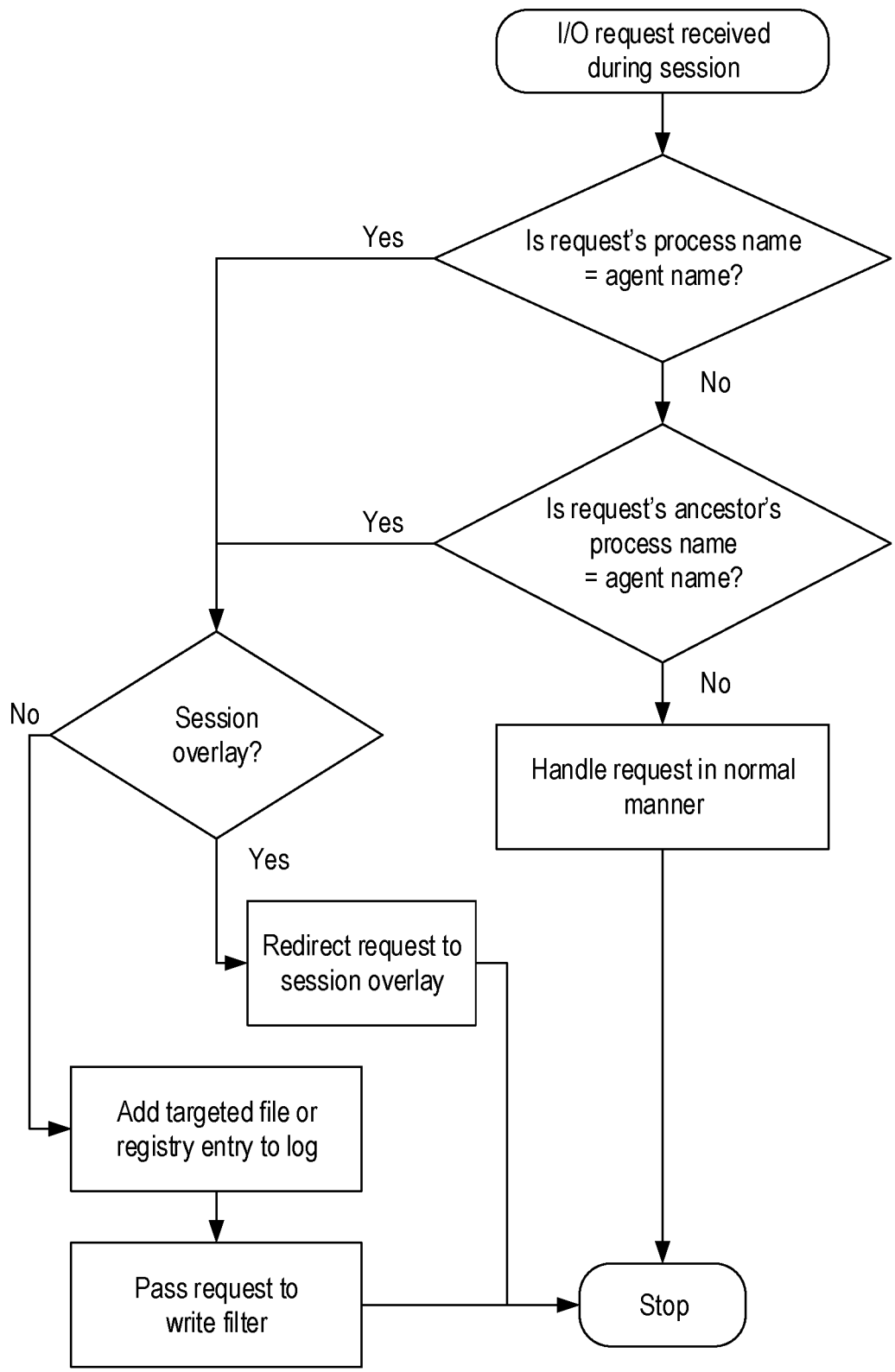

FIGS. 8A and 8B provide flow diagrams to summarize the functionality that an overlay optimizer can perform to enable an application to be installed, updated or reconfigured without disabling the write filter. The flow diagram in FIG. 8A commences when the overlay optimizer receives a session request from an agent (or a similar service). In response to receiving the session request, the overlay optimizer can determine whether the session request is a start request or a stop request. If the session request is a start request, the overlay optimizer can identify the expected overlay size for the corresponding package and then determine whether the expected overlay size exceeds the overlay's free space (or exceeds some defined percentage or threshold related to the overlay's free space). If so, the overlay optimizer can reserve a session overlay within the overlay cache. In either case, the overlay optimizer can commence identifying I/O requests that pertain to the deployment of the corresponding package.

On the other hand, if the received session request is a stop request, the overlay optimizer can stop identifying I/O requests that pertain to the deployment of the corresponding package. The overlay optimizer can also commit to the protected volume all files and registry entries that pertain to the deployment of the package in the manner described above.

The flow diagram in FIG. 8B commences when the overlay optimizer receives an I/O request during a session. For each received I/O request, the overlay optimizer can determine whether the I/O request's process name equals the agent's name. If not, the overlay optimizer can also determine whether the I/O request's ancestor's process name equals the agent's name. If not, the overlay optimizer can handle the I/O request in the normal manner by passing the I/O request to the write filter.

In contrast, if the I/O request's process name or the I/O request's ancestor's process name equals the agent's name, the overlay optimizer can determine whether a session overlay is being employed. If so, the overlay optimizer can redirect the I/O request to the session overlay including updating any log that is used to track which artifacts are stored in the session overlay. If not, the overlay optimizer can add the file or registry entry that the I/O request creates or modifies to a log and pass the I/O request to the write filter.

Figure 9:
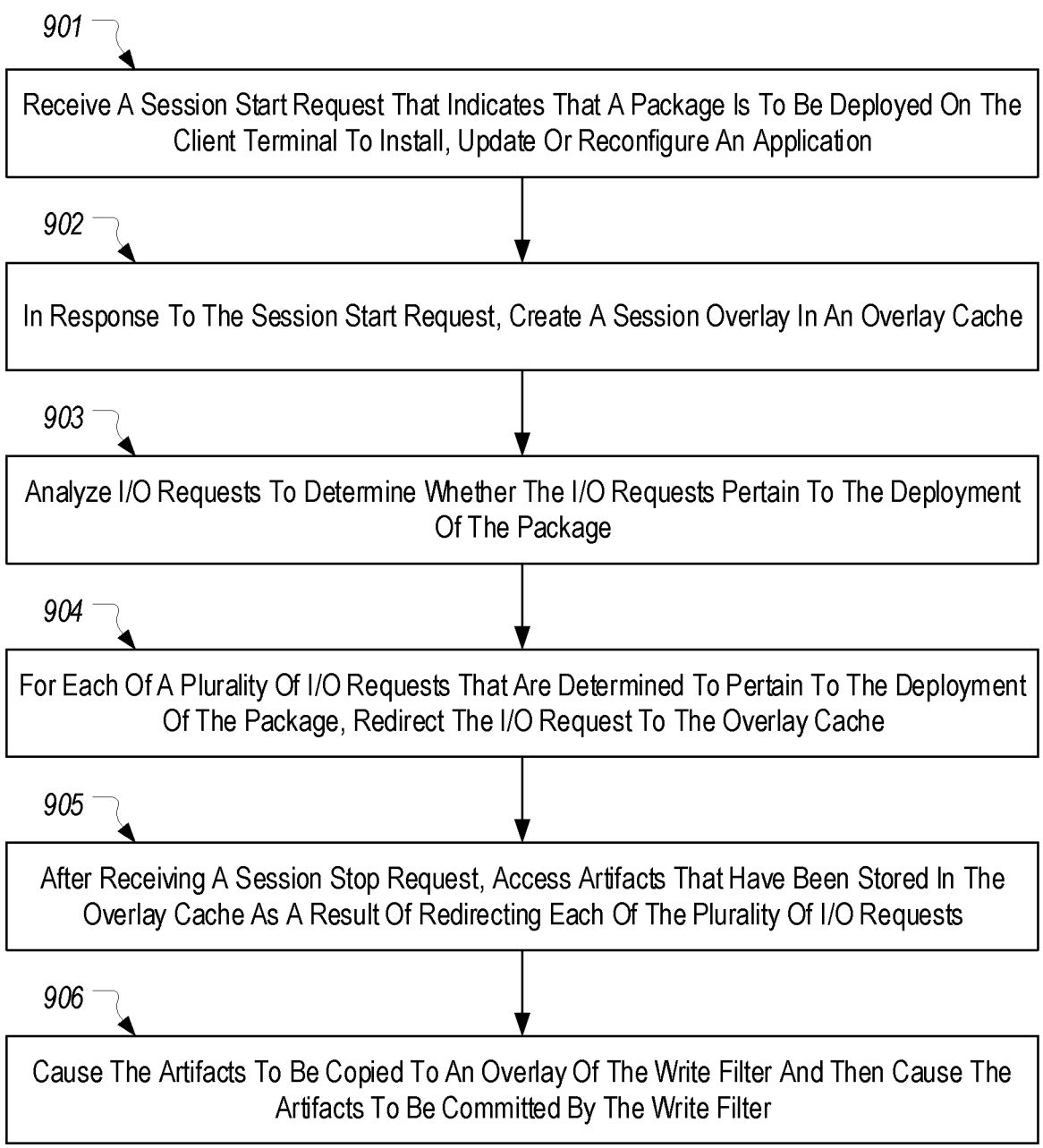
FIG. 9 provides a flowchart of an example method that an overlay optimizer can perform to install, update or reconfigure an application on a client terminal without disabling a write filter.

FIG. 9 provides a flow chart of an example method 900 for installing, updating or reconfiguring an application without disabling the write filter. Method 900 can be implemented by an overlay optimizer such as overlay optimizer 400.

Method 900 includes an act 901 of receiving a session start request that indicates that a package is to be deployed on the client terminal to install, update or reconfigure an application. For example, overlay optimizer 400 can receive start request 501*a*.

Method 900 includes an act 902 of, in response to the session start request, creating a session overlay in an overlay cache. For example, overlay optimizer 400 can create session overlay 240*a*.

Method 900 includes an act 903 of analyzing I/O requests to determine whether the I/O requests pertain to the deployment of the package. For example, overlay optimizer 400 can analyze I/O requests during a session to determine whether they originated from agent 450.

Method 900 includes an act 904 of, for each of a plurality of I/O requests that are determined to pertain to the deployment of the package, redirecting the I/O request to the overlay cache. For example, overlay optimizer 400 can redirect I/O requests to session overlay 240*a*.

Method 900 includes an act 905 of, after receiving a session stop request, accessing artifacts that have been stored in the overlay cache as a result of redirecting each of the plurality of I/O requests. For example, after receiving stop request 501*b*, overlay optimizer 400 can read artifacts stored in session overlay 240*a*.

Method 900 includes an act 906 of causing the artifacts to be copied to an overlay of the write filter and then causing the artifacts to be committed by the write filter. For example, overlay optimizer 400 can write the artifacts to cause write filter 110 to store them in overlay 140 and can then invoke the commit functionality of write filter 110 to cause the artifacts to be persisted to disk 100.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an overlay optimizer on a client terminal that includes a write filter, for installing, updating or reconfiguring an application without disabling the write filter, the method comprising:
    receiving a session start request that indicates that a package is to be deployed on the client terminal to install, update or reconfigure an application, the session start request instructing the overlay optimizer to start a session for deployment of the package, the session start request identifying an expected overly size of the package;
    determining an amount of free space available in an overlay of the write filter;
    comparing the expected overlay size identified in the session start request to the amount of free space available in the overlay;
    when the expected overlay size identified in the session start request exceeds the amount of free space available in the overlay, creating a session overlay in an overlay cache by creating a dummy file in the overlay cache and setting a size of the dummy file to match the expected overlay size identified in the session start request;
    during the session, analyzing input/output (I/O) requests to determine whether the I/O requests pertain to the deployment of the package;
    for each of a first plurality of I/O requests that are determined to pertain to the deployment of the package, redirecting the I/O request to the overlay cache while not redirecting to the overlay cache a second plurality of I/O requests that are determined to not pertain to the deployment of the package;
    after receiving a session stop request, accessing artifacts that have been stored in the overlay cache as a result of redirecting each of the first plurality of I/O requests; and
    causing the artifacts to be copied to the overlay and then causing the artifacts to be committed by the write filter.

2. The method of claim 1, wherein, for at least some of the first plurality of I/O requests, redirecting the I/O request to the overlay cache includes reducing the size of the dummy file by an amount that is based on a size of an artifact that the I/O request will create in the session overlay.

3. The method of claim 1, further comprising:
    in response to the session stop request, ceasing the analysis of the I/O requests.

4. The method of claim 1, wherein causing the artifacts to be copied to the overlay comprises creating I/O requests that cause the write filter to write the artifacts to the overlay.

5. The method of claim 1, wherein the first of I/O requests include at least one I/O request that deletes a particular artifact, the method further comprising:
    maintaining a delete entry in a log, the delete entry identifying the particular artifact;
    after receiving the session stop request, creating an I/O request to cause the particular artifact to be deleted and then committing the delete.

6. The method of claim 1, wherein the artifacts are accessed, copied to the overlay and then committed immediately in response to the session stop request.

7. The method of claim 1, wherein the artifacts are accessed, copied to the overlay and then committed at a next reboot of the client terminal.

8. The method of claim 1, wherein determining whether the I/O requests pertain to the deployment of the package comprises determining whether the I/O requests are associated with an agent.

9. The method of claim 1, further comprising:
    receiving a second session start request that indicates that a second package is to be deployed on the client terminal to install, update or reconfigure an application;
    determining that an expected overlay size of the second package is less than an amount of free space available in the overlay;
    analyzing I/O requests received after the second session start request to determine whether the I/O requests pertain to deployment of the second package;
    for each of a third plurality of I/O requests that are determined to pertain to the deployment of the second package, maintaining a log of artifacts that are targeted by the third plurality of I/O requests;
    in response to a second session stop request, employing the log to cause the write filter to commit each of the artifacts.

10. The method of claim 1, further comprising:
    accessing a log to identify the artifacts that have been stored in the overlay cache as a result of redirecting each of the first plurality of I/O requests.

11. One or more computer storage media storing computer executable instructions which when executed on a client terminal that includes a write filter, implement an overlay optimizer that performs a method for installing, updating or reconfiguring an application without disabling the write filter, the method comprising:
    receiving a session start request that indicates that a package is to be deployed on the client terminal to install, update or reconfigure an application, the session start request instructing the overlay optimizer to start a session for deployment of the package, the session start request identifying an expected overlay size of the package;
    determining an amount of free space available in an overlay of the write filter;
    comparing the expected overlay size identified in the session start request to the amount of free space available in the overlay;
    when the expected overlay size identified in the session start request exceeds the amount of free space available in the overlay, creating a session overlay in an overlay cache by creating a dummy file in the overlay cache and setting a size of the dummy file to match the expected overlay size identified in the session start request;
    during the session, analyzing input/output (I/O) requests to determine whether the I/O requests pertain to the deployment of the package;
    for each of a first plurality of I/O requests that are determined to pertain to the deployment of the package, redirecting the I/O request to the overlay cache while not redirecting to the overlay cache a second plurality of I/O requests that are determined to not pertain to the deployment of the package; after receiving a session stop request, accessing artifacts that have been stored in the overlay cache as a result of redirecting each of the first plurality of I/O requests; and causing the artifacts to be copied to the overlay and then causing the artifacts to be committed by the write filter.

12. The computer storage media of claim 11, wherein, for at least some of the first plurality of I/O requests, redirecting the I/O request to the overlay cache includes reducing the size of the dummy file by an amount that is based on a size of an artifact that the I/O request will create in the session overlay.

13. The computer storage media of claim 11, wherein the method further comprises:
in response to the session stop request, ceasing the analysis of the I/O requests.

14. The computer storage media of claim 11, wherein causing the artifacts to be copied to the overlay comprises creating I/O requests that cause the write filter to write the artifacts to the overlay.

15. The computer storage media of claim 11, wherein the first plurality of I/O requests include at least one I/O request that deletes a particular artifact, the method further comprising:
maintaining a delete entry in a log, the delete entry identifying the particular artifact;
after receiving the session stop request, creating an I/O request to cause the particular artifact to be deleted and then committing the delete.

16. The computer storage media of claim 11, wherein the artifacts are accessed, copied to the overlay and then committed immediately in response to the session stop request.

17. The computer storage media of claim 11, wherein the artifacts are accessed, copied to the overlay and then committed at a next reboot of the client terminal.

18. The computer storage media of claim 11, wherein determining whether the I/O requests pertain to the deployment of the package comprises determining whether the I/O requests are associated with an agent.

19. The computer storage media of claim 11, wherein the method further comprises:
receiving a second session start request that indicates that a second package is to be deployed on the client terminal to install, update or reconfigure an application;
determining that an expected overlay size of the second package is less than an amount of free space available in the overlay;
analyzing I/O requests received after the second session start request to determine whether the I/O requests pertain to deployment of the second package;
for each of a third plurality of I/O requests that are determined to pertain to the deployment of the second package, maintaining a log of artifacts that are targeted by the third plurality of I/O requests;
in response to a second session stop request, employing the log to cause the write filter to commit each of the artifacts.

20. The computer storage media of claim 11, wherein the method further comprises:
accessing a log to identify the artifacts that have been stored in the overlay cache as a result of redirecting each of the first plurality of I/O requests.

\* \* \* \* \*